(12) United States Patent
No (10) Patent No.: US 12,084,014 B2
(45) Date of Patent: Sep. 10, 2024

(54) VEHICLE CONTROL APPARATUS AND VEHICLE CONTROL METHOD

(71) Applicant: HL MANDO CORPORATION, Gyeonggi-do (KR)

(72) Inventor: Su Hwan No, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 1091 days.

(21) Appl. No.: 16/931,271

(22) Filed: Jul. 16, 2020

(65) Prior Publication Data

US 2021/0024044 A1 Jan. 28, 2021

(30) Foreign Application Priority Data

Jul. 23, 2019 (KR) ........................ 10-2019-0088915

(51) Int. Cl.
*B60T 13/74* (2006.01)
*B60T 13/58* (2006.01)
(Continued)

(52) U.S. Cl.
CPC .......... *B60T 13/741* (2013.01); *B60T 13/588* (2013.01); *B60T 13/662* (2013.01); *B60T 17/22* (2013.01)

(58) Field of Classification Search
CPC .... B60T 13/741; B60T 13/588; B60T 13/662; B60T 17/22; B60T 13/74; B60T 8/171;
(Continued)

(56) References Cited

U.S. PATENT DOCUMENTS

2012/0205202 A1\* 8/2012 Baehrle-Miller ..... B60T 13/588
188/106 P
2017/0106848 A1\* 4/2017 Ritter .................... B60T 13/662

FOREIGN PATENT DOCUMENTS

JP 2009-262709 11/2009
KR 10-2011-0125322 11/2011
(Continued)

OTHER PUBLICATIONS

Office Action dated Dec. 20, 2023 for Korean Patent Application No. 10-2019-0088915 and its English translation from Global Dossier.

*Primary Examiner* — Ig T An
(74) *Attorney, Agent, or Firm* — Womble Bond Dickinson (US) LLP (57) ABSTRACT

A vehicle control apparatus includes: a sensor configured to sense a current value and a voltage value applied to a motor of an actuator of an electronic parking brake (EPB) device; a controller configured to: estimate a speed value of the motor based on the sensed current value and the sensed voltage value; calculate a moving distance value of a spindle of the actuator based on the estimated speed value of the motor; estimate a position value of the spindle based on the calculated moving distance value of the spindle; estimate an EPB clamping force that acts on a brake disc of the EPB device based on the estimated position value of the spindle; calculate an EPB clamping force error compensation value between the estimated EPB clamping force value and a measured EPB clamping force value; and transmit, to the EPB device, a parking force compensation command on which the calculated EPB clamping force error compensation value is reflected to compensate for a parking force of the EPB device.

16 Claims, 10 Drawing Sheets

(51) Int. Cl.
*B60T 13/66* (2006.01)
*B60T 17/22* (2006.01)

(58) Field of Classification Search
CPC ...... B60T 8/172; B60T 8/32; F16D 2066/005; B60Y 2400/3084; B60Y 2400/3086
See application file for complete search history.

(56) References Cited

FOREIGN PATENT DOCUMENTS

| | | | | |
|---|---|---|---|---|
| KR | 1020140036297 | * | 3/2014 | ............. B60T 13/74 |
| KR | 10-1402706 | | 6/2014 | |
| KR | 10-1958503 | | 3/2019 | |
| KR | 10-2019-0063892 | | 6/2019 | |
| PA | 2013-501668 | | 1/2013 | |

* cited by examiner

VEHICLE CONTROL APPARATUS AND VEHICLE CONTROL METHOD

CROSS-REFERENCE TO RELATED APPLICATION

This application is based on and claims priority under 35 U.S.C. § 119 to Korean Patent Application No. 10-2019-0088915, filed on Jul. 23, 2019 in the Korean Intellectual Property Office, the disclosure of which is incorporated herein by reference.

TECHNICAL FIELD

The present disclosure relates to a vehicle control apparatus and a vehicle control method.

BACKGROUND

In general, an electronic parking brake (EPB) device, which is known as a driver-friendly automatic brake device, operates such that the braking is automatically activated when the ignition is turned off, and is automatically deactivated when the ignition is turned on, so that the convenience of parking is provided.

For example, there is disclosed Korean registered patent No. 10-1958503 (Mar. 8, 2019), which relates to a method of adjusting a parking brake and a control unit thereof in which when the parking brake is adjusted, a motor constant, a motor resistance, and a ratio value of applied operating voltage and maximum current are used to determine a clamping force.

However, the conventional method of adjusting the parking brake and the control unit thereof have a limitation in effectively improving the parking force of the EPB device.

In addition, the conventional method of adjusting the parking brake and the control unit thereof have a limitation in suppressing an increase in power consumption by efficiently driving the EPB device, and a limitation in performing cooperative control with an electronic stability control (ESC) device, which leads to limitation in stably and efficiently controlling the vehicle.

In addition, the conventional method of adjusting the parking brake and the control unit thereof has a limitation in suppressing an increase in power consumption by efficiently driving the ESC device during cooperative control with the ESC device, and a limitation in allowing the ESC device to identify the EPB device in an abnormal operation state, which leads to limitation in improving the reliability of the vehicle, and reducing the maintenance time.

SUMMARY

An aspect of the present disclosure is to provide a vehicle control apparatus and a vehicle control method that are capable of effectively improving the parking force of an EPB device.

It is another aspect of the disclosure to provide a vehicle control apparatus and a vehicle control method that are capable of efficiently driving an EPB device, thereby suppressing an increase in power consumption.

It is another aspect of the disclosure to provide a vehicle control apparatus and a vehicle control method that are capable of controlling a vehicle more stably and efficiently.

It is another aspect of the disclosure to provide a vehicle control apparatus and a vehicle control method that are capable of efficiently driving an ESC device, thereby suppressing an increase in power consumption.

It is another aspect of the disclosure to provide a vehicle control apparatus and a vehicle control method that are capable of improving the vehicle reliability.

It is another aspect of the disclosure to provide a vehicle control apparatus and a vehicle control method that are capable of reducing the maintenance time.

Additional aspects of the disclosure will be set forth in part in the description which follows and, in part, will be obvious from the description, or may be learned by practice of the disclosure.

In accordance with one aspect of the present disclosure, a vehicle control apparatus includes: a sensor configured to sense a current value and a voltage value applied to a motor of an actuator of an electronic parking brake (EPB) device; and a controller configured to: estimate a speed value of the motor based on the sensed current value and the sensed voltage value; calculate a moving distance value of a spindle of the actuator based on the estimated speed value of the motor; estimate a position value of the spindle based on the calculated moving distance value of the spindle; estimate an EPB clamping force that acts on a brake disc of the EPB device based on the estimated position value of the spindle; calculate an EPB clamping force error compensation value between the estimated EPB clamping force value and a measured EPB clamping force value; and transmit, to the EPB device, a parking force compensation command on which the calculated EPB clamping force error compensation value is reflected to compensate for a parking force of the EPB device.

The controller may calculate the EPB clamping force error compensation value during an EPB clamping force error compensation section preceded by an EPB clamping preparation section and followed by an EPB clamping section of the EPB device.

The controller may transmit the parking force compensation command to the EPB device to compensate for the parking force of the EPB device by reflecting the calculated EPB clamping force error compensation value, during the EPB clamping section of the EPB device.

When measuring the EPB clamping force value, the controller may be configured to: request a target wheel pressure value required for a parking force of the EPE device from a hydraulic control unit (HCU); measure moving distance values of the spindle moved backward and forward based on the current values applied to the motor to a position of an advanced piston of the actuator while a target wheel pressure corresponding the requested target wheel pressure value is maintained; and output, upon the measurement of the moving distance values of the spindle, an EPB clamping force corresponding to the moving distance values of the spindle after the target wheel pressure is released.

When the EPB device compensates for the parking force, a magnitude of current applied to the motor may be increased according to a size of the calculated EPB clamping force error compensation value.

The controller may prevent the parking force compensation command from being transmitted to the EPB device when the calculated EPB clamping force error compensation value is smaller than a preset reference value, and may transmit the parking force compensation command to the EPB device when the calculated EPB clamping force error compensation value is larger than the preset reference value.

The controller may be further configured to: when the EPB device compensates for the parking force by reflecting the calculated EPB clamping force error compensation value, determine whether the parking force is compensated for with a parking force value on which the EPB clamping force error compensation value is reflected; and upon determining that the parking force is not compensated for with the parking force value on which the EPB clamping force error compensation value is reflected, transmit a cooperative control command to an electronic stability control (ESC) device.

The controller may be configured to: prevent the cooperative control command from being transmitted to the ESC device when the parking force value on which the EPB clamping force error compensation value is reflected is smaller than a preset reference value; and transmit the cooperative control command to the ESC device when the parking force value on which the EPB clamping force error compensation value is reflected is larger than the preset reference value.

In accordance with another aspect of the present disclosure, a vehicle control method includes: sensing a current value and a voltage value applied to a motor of an actuator of an electronic parking brake (EPB) device; estimating a speed value of the motor based on the sensed current value and the sensed voltage value; calculating a moving distance value of a spindle of the actuator based on the estimated speed value of the motor; estimating a position value of the spindle based on the calculated moving distance value of the spindle; estimating an EPB clamping force that acts on a brake disc of the EPB device based on the estimated position value of the spindle; calculating an EPB clamping force error compensation value between the estimated EPB clamping force value and a measured EPB clamping force value; and transmitting, to the EPB device, a parking force compensation command on which the calculated EPB clamping force error compensation value is reflected to compensate for a parking force of the EPB device.

The EPB clamping force error compensation value may be calculated during an EPB clamping force error compensation section preceded by an EPB clamping preparation section and followed by an EPB clamping section of the EPB device.

The parking force compensation command may be transmitted to the EPB device to compensate for the parking force of the EPB device by reflecting the calculated EPB clamping force error compensation value, during the EPB clamping section of the EPB device.

When measuring the EPB clamping force value, a target wheel pressure value required for a parking force of the EPE device may be requested from a hydraulic control unit (HCU); moving distance values of the spindle moved backward and forward based on the current values applied to the motor to a position of an advanced piston of the actuator may be measured while a target wheel pressure corresponding the requested target wheel pressure value is maintained; and upon the measurement of the moving distance values of the spindle, an EPB clamping force corresponding to the moving distance values of the spindle may be output after the target wheel pressure is released.

When the EPB device compensates for the parking force, a magnitude of current applied to the motor may be increased according to a size of the calculated EPB clamping force error compensation value.

The parking force compensation command may be prevented from being transmitted to the EPB device when the calculated EPB clamping force error compensation value is smaller than a preset reference value, and the parking force compensation command may be transmitted to the EPB device when the calculated EPB clamping force error compensation value is larger than the preset reference value.

The vehicle control method may further include: when the EPB device compensates for the parking force by reflecting the calculated EPB clamping force error compensation value, determining whether the parking force is compensated for with a parking force value on which the EPB clamping force error compensation value is reflected; and upon determining that the parking force is not compensated for with the parking force value on which the EPB clamping force error compensation value is reflected, transmitting a cooperative control command to an electronic stability control (ESC) device.

The cooperative control command may be prevented from being transmitted to the ESC device when the parking force value on which the EPB clamping force error compensation value is reflected is smaller than a preset reference value; and the cooperative control command is transmitted to the ESC device when the parking force value on which the EPB clamping force error compensation value is reflected is larger than the preset reference value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. In order to make the description of the present invention clear, unrelated parts are not shown and, the sizes of components are exaggerated for clarity.

Figure 1:
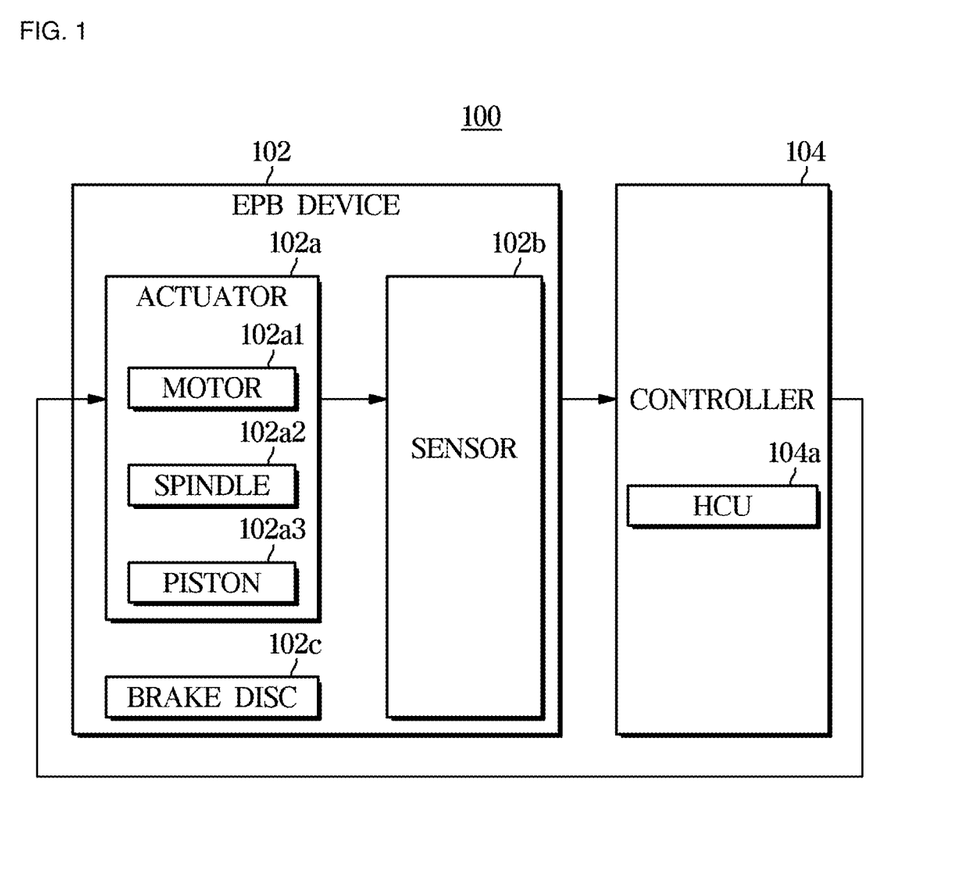
FIG. 1 is a block diagram illustrating an example of a vehicle control apparatus according to an embodiment of the present disclosure.
Figure 2:
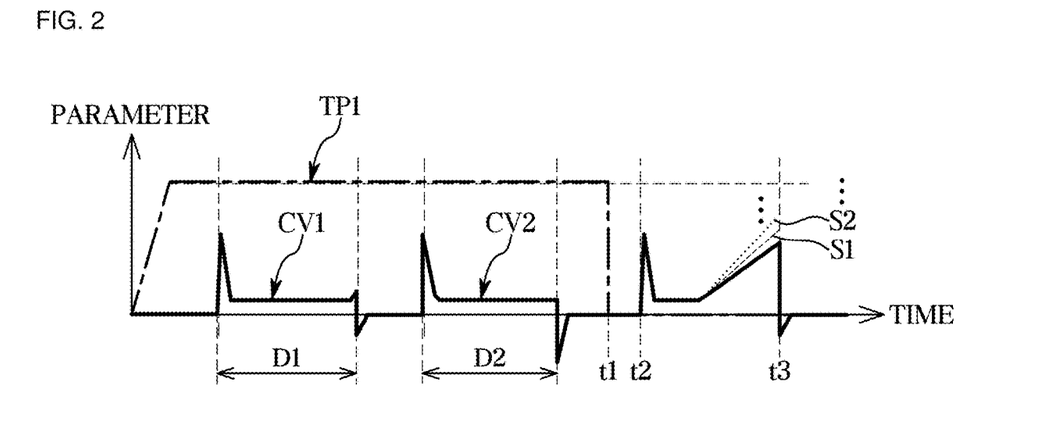
FIG. 2 is a view illustrating an example of a process of compensating for a parking force by reflecting an EPB clamping force error compensation value of an EPB device shown in FIG. 1.

FIG. 1 is a block diagram illustrating an example of a vehicle control apparatus according to an embodiment of the present disclosure, FIG. 2 is a view illustrating an example of a process of compensating for a parking force by reflecting an EPB clamping force error compensation value of an EPB device shown in FIG. 1.

Figure 3:
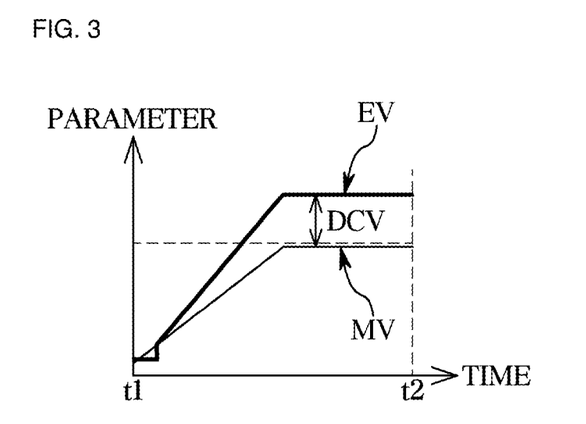
FIG. 3 is a view illustrating an example of a process of calculating an EPB clamping force error compensation value during an EPB clamping force error compensation section of FIG. 2.

FIG. 3 is a view illustrating an example of a process of calculating an EPB clamping force error compensation value during an EPB clamping force error compensation section of FIG. 2.

Referring to FIGS. 1 to 3, a vehicle control apparatus 100 according to an embodiment of the present disclosure includes an electronic parking brake (EPB) device 102 and a controller 104.

In this case, the EPB device 102 includes an actuator 102a, a sensor 102b, and a brake disc 102c.

The sensor 102b senses a current value and a voltage value applied to a motor 102a1 of the actuator 102a.

The controller 104 estimates a speed value of the motor 102a1 based on the current value and the voltage value sensed by the sensor 102b, and based on the estimated speed value of the motor 102a1, calculates a moving distance value of a spindle 102a2 of the actuator 102a.

The controller 104 estimates a position value of the spindle 102a2 based on the calculated moving distance value of the spindle 102a2, and estimates an EPB clamping force acting on the brake disk 102c based on the estimated position value of the spindle 102a2.

Referring to FIGS. 1 to 3, the controller 104 calculates an EPB clamping force error compensation value DCV between the estimated EPB clamping force value EV and a measured EPB clamping force value MV.

For example, the controller 104 may calculate the EPB clamping force error compensation value DCV during an EPB clamping force error compensation section t1 to t2 preceded by an EPB clamping preparation section 0 to t1 and followed by an EPB clamping section t2 to t3 of the EPB device 102.

In this case, when the EPB clamping force value MV is measured, the controller 104 may request a target wheel pressure value TP1 required for a parking force of the EPB device 102 from a hydraulic control unit (HCU) 104a.

In addition, the controller 104 may measure moving distance values D1 and D2 of the spindle 102a2 moved backward and forward based on the current values CV1 and CV2 applied to the motor 102a1 to the position of an advanced piston 102a3 of the actuator 102 during the EPB clamping preparation section 0 to t1 in which a target wheel pressure corresponding to the requested target wheel pressure value TP1 is maintained.

In addition, when the moving distance values D1 and D2 of the spindle 102a2 are measured, the controller 104 may output an EPB clamping force value MV corresponding to the moving distance values D1 and D2 of the spindle 102a2 after the time t1 from which the target wheel pressure is released.

The controller 104 transmits a parking force compensation command to the EPB device 102 such that the EPB device 102 compensates for the parking force by reflecting the calculated EPB clamping force error compensation value DCV.

For example, the controller 104 may transmit the parking force compensation command to the EPB device 102 such that the EPB device 102 compensates for the parking force by reflecting the calculated EPB clamping force error compensation value DCV during the EPB clamping section t2 to t3 of the EPB device 102.

In this case, when the EPB device 102 compensates for the parking force, the magnitude of current applied to the motor 102a1 may be increased according to a size of the calculated EPB clamping force error compensation value DCV.

The controller 104 of the vehicle control apparatus 100 according to the embodiment of the present disclosure may not transmit the parking force compensation command to the EPB device 102 when the calculated EPB clamping force error compensation value DCV is determined to be smaller than a preset reference value.

That is, upon determining that a parking force is expected so small to be felt by the driver, that is, a state in which the calculated EPB clamping force error compensation value DCV is smaller than the preset set reference value, the controller 104 may not transmit the parking force compensation command to the EPB device 102.

In addition, upon determining that the calculated EPB clamping force error compensation value DCV is greater than the preset reference value, the controller 104 may transmit the parking force compensation command to the EPB device 102.

That is, upon determining that a parking force is expected to be large enough to be felt by the driver, that is, a state in which the calculated EPB clamping force error compensation value DCV is larger than the preset set reference value, the controller 104 may transmit the parking force compensation command to the EPB device 102.

Figure 4:
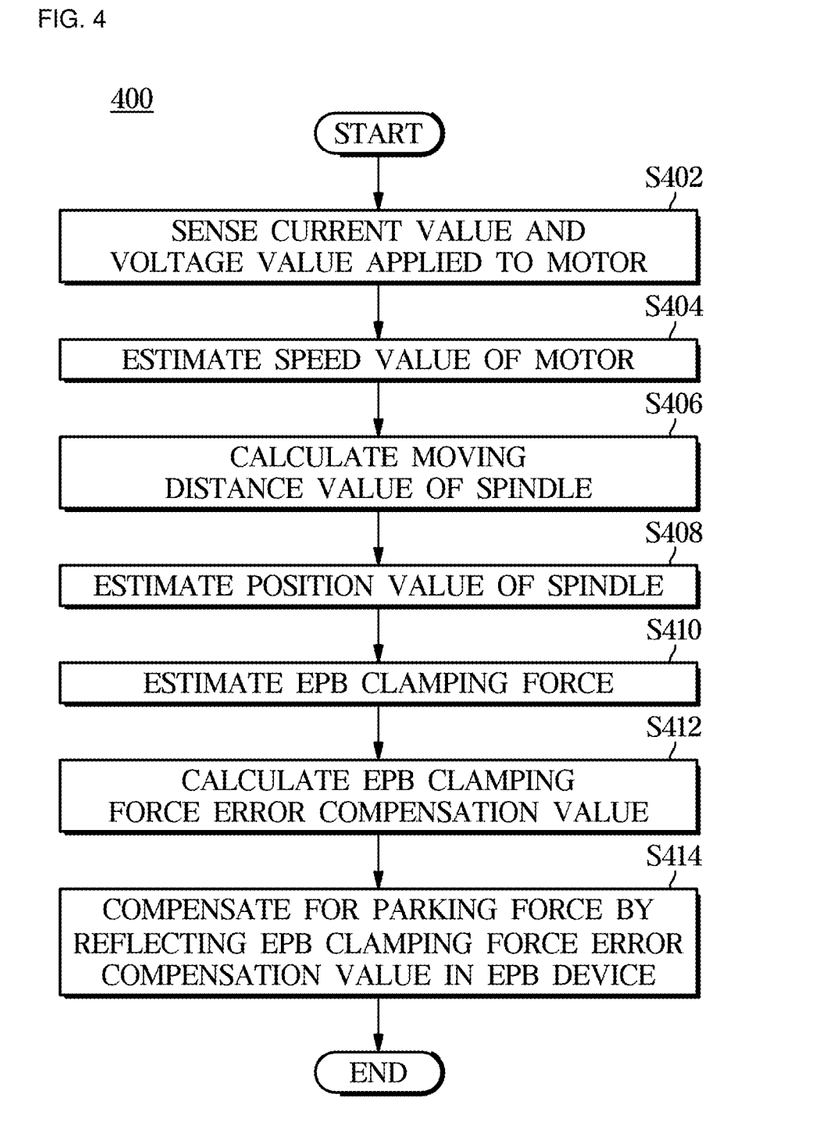
FIG. 4 is a flowchart showing an example of a vehicle control method performed by a vehicle control apparatus according to an embodiment of the present disclosure.
Figure 5:
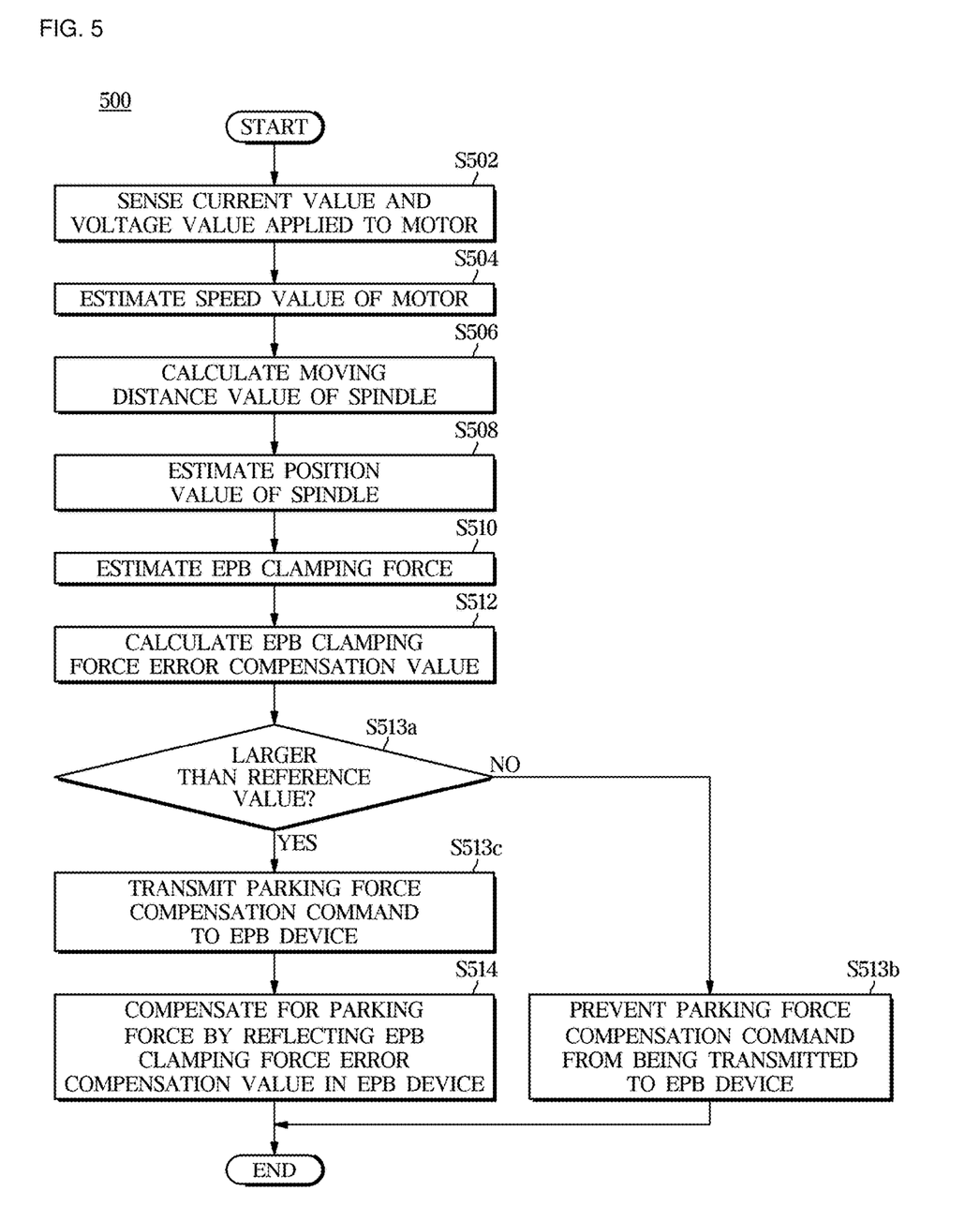
FIG. 5 is a flowchart showing another example of a vehicle control method performed by a vehicle control apparatus according to another embodiment of the present disclosure.

FIG. 4 is a flowchart showing an example of a vehicle control method performed by a vehicle control apparatus according to an embodiment of the present disclosure, and FIG. 5 is a flowchart showing another example of a vehicle control method performed by a vehicle control apparatus according to another embodiment of the present disclosure.

Referring to FIGS. 4 and 5, a vehicle control method (400 or 500) performed by the vehicle control apparatus (100 of FIG. 1) according to an embodiment of the present disclosure includes a first step S402 or S502, a second step S404 or S504, a third step S406 or S506, a fourth step S408 of S508, a fifth step S410 or S510, a sixth step S412 or S512, and a seventh step S414 or S514.

In the first step S402 or S502, current and voltage values applied to the motor (102a1 in FIG. 1) of the actuator (102a of FIG. 1) may be sensed by the sensor (102b in FIG. 1).

In the second step S404 or S504, the speed value of the motor (102a1 in FIG. 1) may be estimated by the controller (104 in FIG. 1) based on the current value and the voltage value sensed by the sensor (102b in FIG. 1).

In the third step S406 or S506, the moving distance value of the spindle (102a2 of FIG. 1) of the actuator (102a of FIG. 1) may be calculated by the controller (104 in FIG. 1) based on the estimated speed value of the motor (102a1 of FIG. 1).

In the fourth step S408 or S508, the position value of the spindle (102a2 in FIG. 1) may be estimated by the controller (104 in FIG. 1) based on the calculated moving distance value of the spindle (102a2 in FIG. 1).

In the fifth step S410 or S510, the EPB clamping force acting on the brake disk (102c in FIG. 1) may be estimated by the controller (104 in FIG. 1) based on the estimated position of the spindle 102*a*2.

In the sixth step S412 or S512, the EPB clamping force error compensation value (DCV in FIG. 3) between the estimated EPB clamping force value (EV in FIG. 3) and the measured EPB clamping force value (MV in FIG. 3) may be calculated by the controller (104 in FIG. 1).

For example, in the sixth step S412 or S512, the EPB clamping force error compensation value (DCV in FIG. 3) may be calculate by the controller (104 in FIG. 1) during the EPB clamping force error compensation section (t1 to t2 in FIG. 2) preceded by the EPB clamping preparation section (0 to t1 in FIG. 2) and followed by the EPB clamping section (t2 to t3 in FIG. 2) of the EPB device (102 in FIG. 1).

In the sixth step S412 or S512, when the EPB clamping force value (MV in FIG. 3) is measured, the target wheel pressure value (TP1 in FIG. 2) required for a parking force of the EPB device (102 in FIG. 2) may be requested to the HCU (104*a* in FIG. 1) by the controller (104 in FIG. 1).

Thereafter, in the sixth step S412 or S512, moving distance values (D1 and D2 in FIG. 2) of the spindle (102*a*2 in FIG. 1) moved backward and forward based on the current values (CV1 and CV2 in FIG. 2) applied to the motor (102*a*1 in FIG. 1) to the position of an advanced piston (102*a*3 in FIG. 1) of the actuator (102 in FIG. 1) may be measured by the controller (103 in FIG. 1) during the EPB clamping preparation section (0 to t1 in FIG. 2) in which a target wheel pressure corresponding to the requested target wheel pressure value (TP1 in FIG. 2) is maintained.

Thereafter, in the sixth step S412 or S512, when the moving distance values (D1 and D2 in FIG. 2) of the spindle (102*a*2 in FIG. 1) are measured, the EPB clamping force value (MV in FIG. 3) corresponding to the moving distance values (D1 and D2 in FIG. 2) of the spindle (102*a*2 in FIG. 1) may be output by the controller (104 in FIG. 1) after the time t1 from which the target wheel pressure is released.

As shown in FIG. 5, the sixth step may include, if it is determined by the controller (104 in FIG. 1) that the calculated EPB clamping force error compensation value (DCV in FIG. 3) is determined to be smaller than a reference value that is set in the controller (104 in FIG. 1) (S513*a*), preventing the parking force compensation command from being transmitted from the controller (104 in FIG. 1) to the EPB device (102 in FIG. 1) (S513*b*).

On the other hand, the sixth step may include, if it is determined by the controller (104 in FIG. 1) that the calculated EPB clamping force error compensation value (DCV in FIG. 3) is determined to be larger than the reference value that is set in the controller (104 in FIG. 1) (S513*a*), allowing the parking force compensation command to be transmitted from the controller (104 in FIG. 1) to the EPB device (102 in FIG. 1) (S513*c*).

In the seventh step S414 or S514, the parking force compensation command is transmitted from the controller (104 in FIG. 1) to the EPB device (102 in FIG. 1) such that the EPB device (102 in FIG. 2) compensates for the parking force by reflecting the calculated EPB clamping force error compensation value (DCV in FIG. 3).

For example, in the seventh step S414 or S514, the parking force compensation command is transmitted from the controller (104 in FIG. 1) to the EPB device (102 in FIG. 1) such that the EPB device (102 in FIG. 1) compensates for the parking force by reflecting the calculated EPB clamping force error compensation value (DCV in FIG. 3) during the EPB clamping section (t2 to t3 in FIG. 2) of the EPB device (102 in FIG. 1).

In this case, in the seventh step S414 or S514, when the parking force is compensated for by the EPB device 102, the magnitude of current (S1 or S2 in FIG. 2) applied to the motor (102*a*1 in FIG. 1) may be increased according to the size of the calculated EPB clamping force error compensation value (DCV in FIG. 3).

Figure 6:
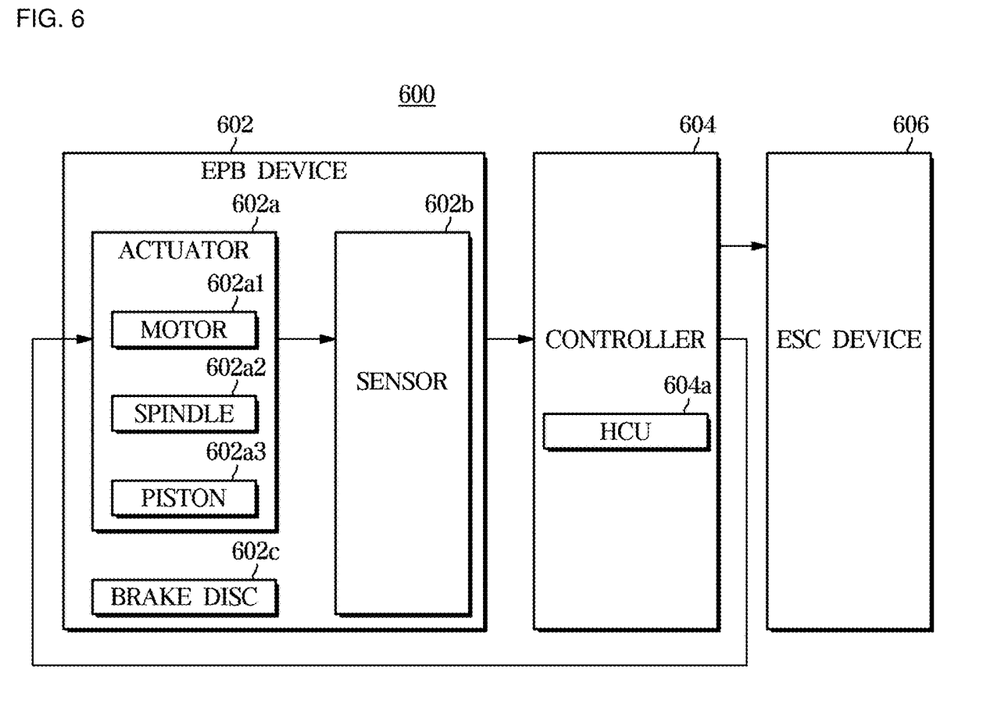
FIG. 6 is a block diagram illustrating another example of a vehicle control apparatus according to an embodiment of the present disclosure.

FIG. 6 is a block diagram illustrating another example of a vehicle control apparatus according to another embodiment of the present disclosure.

Referring to FIG. 6, a vehicle control apparatus 600 according to another embodiment of the present disclosure includes an EPB device 602 and a controller 604, similar to the vehicle control apparatus (100 in FIG. 1).

The function for each of the components of the vehicle control apparatus 600 according to the embodiment of the present disclosure and the organic connection relationship between the components are identical to those of the vehicle control apparatus (100 in FIG. 1). Details thereof will be omitted in the following description.

Here, the controller 604 of the vehicle control apparatus 600 according to the embodiment of the present disclosure, when the EPB device (102 in FIG. 1) compensates for the parking force by reflecting the calculated EPB clamping force error compensation value (DCV in FIG. 3), may further configured to determine whether the parking force is compensated for with a parking force value on which the EPB clamping force error compensation value (DCV in FIG. 3) is reflected.

In this case, the controller 604, upon determining that the parking force is not compensated for with the parking force value on which the EPB clamping force error compensation value (DCV in FIG. 3) is reflected, may transmit a cooperative control command to an electronic stability control (ESC) device 606.

The controller 604 of the vehicle control apparatus 600 according to the embodiment of the present disclosure may be configured to: upon determining that the parking force value on which the EPB clamping force error compensation value (DCV in FIG. 3) is reflected is smaller than a preset reference value, prevent the cooperative control command from being transmitted to the ESC device 606.

That is, the controller 604 may be configured to: upon determining that the parking force value on which the EPB clamping force error compensation value (DCV in FIG. 3) is reflected is smaller than the preset reference value, that is, a state in which a parking force is expected so small to be felt by a driver, prevent the cooperative control command from being transmitted to the ESC device 606.

In addition, the controller 604 may be configured to: upon determining that the parking force value on which the EPB clamping force error compensation value (DCV in FIG. 3) is reflected is larger than the preset reference value, transmit the cooperative control command to the ESC device 606.

That is, the controller 604 may be configured to: upon determining that the parking force value on which the EPB clamping force error compensation value (DCV in FIG. 3) is reflected is larger than the preset reference value, that is, a state in which a parking force is expected large enough to be felt by a driver, transmit the cooperative control command to the ESC device 606.

Figure 7:
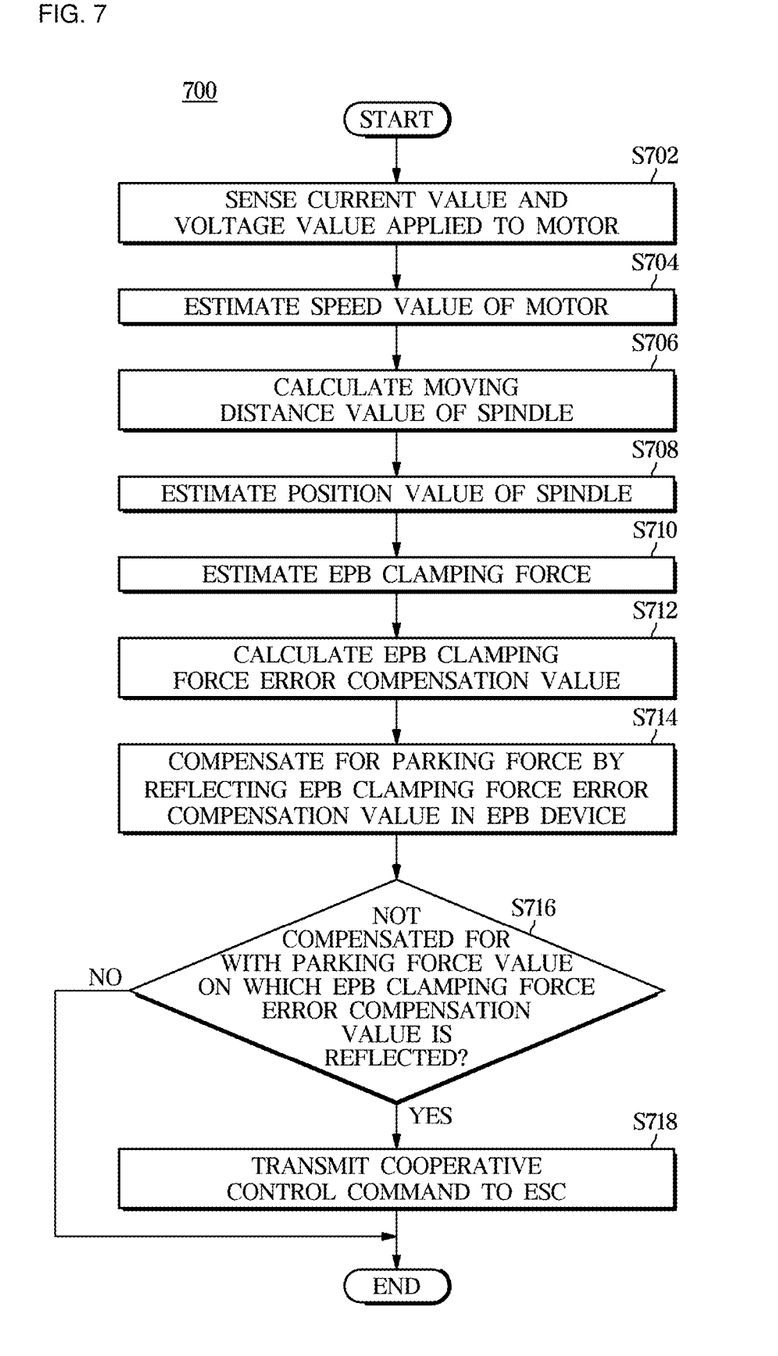
FIG. 7 is a flowchart showing still another example of a vehicle control method performed by a vehicle control apparatus according to an embodiment of the present disclosure.
Figure 8:
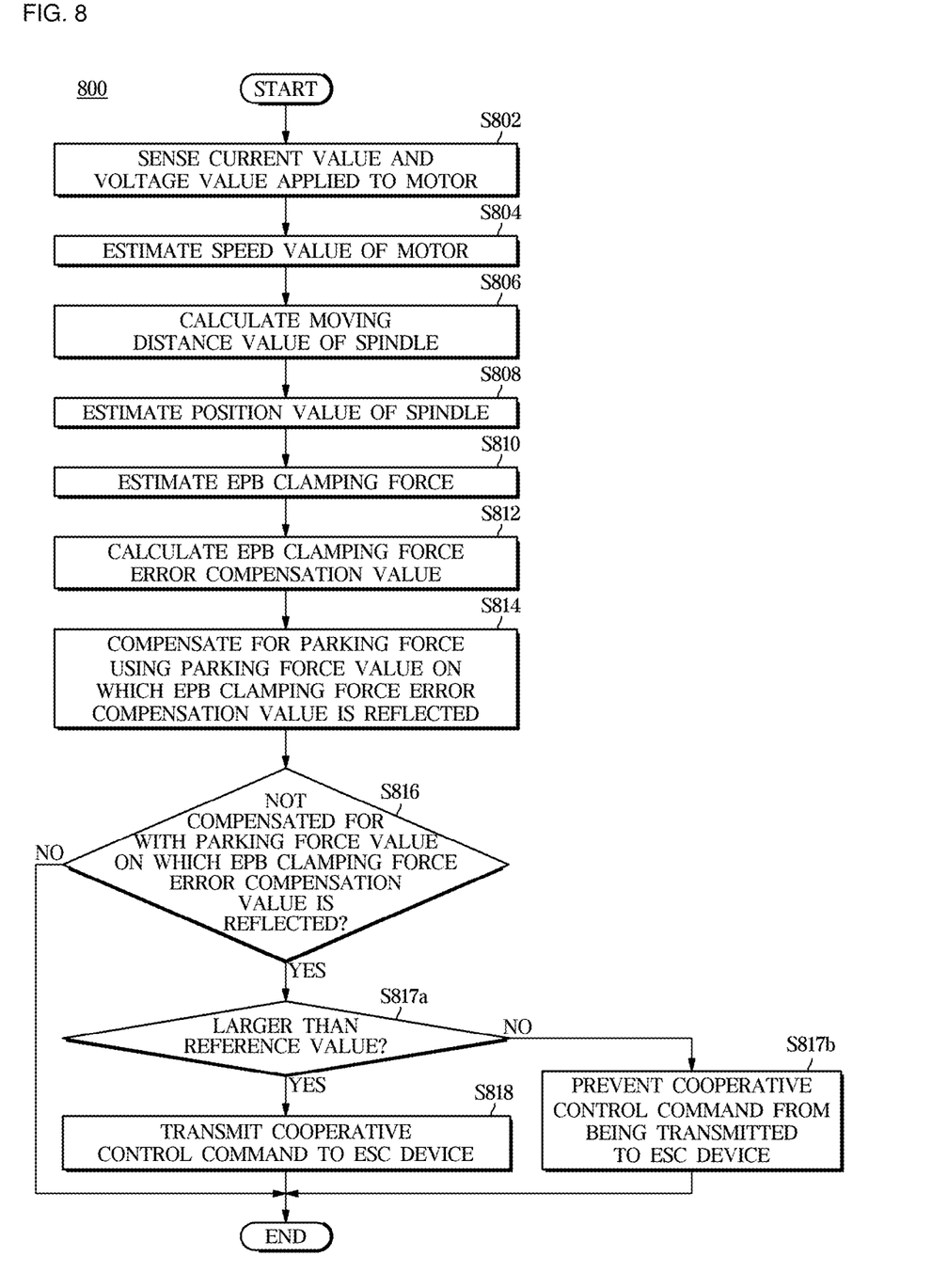
FIG. 8 is a flowchart showing still another example of a vehicle control method performed by a vehicle control apparatus according to an embodiment of the present disclosure.

FIG. 7 is a flowchart showing still another example of a vehicle control method performed by a vehicle control apparatus according to an embodiment of the present disclosure, and FIG. 8 is a flowchart showing another example of a vehicle control method performed by a vehicle control apparatus according to a still embodiment of the present disclosure.

Referring to FIGS. 7 and 8, similar to the vehicle control method (400 in FIG. 4) performed by the vehicle control apparatus (100 in FIG. 2), a vehicle control method (700 or 800) performed by the vehicle control apparatus (600 of FIG. 6) according to an embodiment of the present disclosure includes a first step S702 or S802, a second steps S704 or S804, a third step S706 or S806, a fourth step S708 of S808, a fifth step S710 or S810, a sixth step S712 or S812, and a seventh step S714 or S814.

The function for each of the steps of the vehicle control method 700 or 800 performed by the vehicle control apparatus (600 in FIG. 6) according to the embodiment of the present disclosure and the organic connection relationship between the steps are identical to those of the vehicle control method (400 in FIG. 1) performed by the vehicle control apparatus (100 in FIG. 1). Details thereof will be omitted in the following description.

Here, the vehicle control method 700 or 800 performed the vehicle control apparatus 600 according to the embodiment of the present disclosure may further include an eighth step (S716, S718, S816, S818) (S817a, S817b).

In the eighth step S716 or S816, when the parking force is compensated for by the EPB device (102 in FIG. 1) compensates for by reflecting the calculated EPB clamping force error compensation value (DCV in FIG. 3), it is further determined by the controller (604 in FIG. 6) whether the parking force is compensated for with a parking force value on which the EPB clamping force error compensation value (DCV in FIG. 3) is reflected.

In this case, in the eight step S718, if it is determined by the controller 604 that the parking force is not compensated for with the parking force value on which the EPB clamping force error compensation value (DCV in FIG. 3) is reflected, a cooperative control command may be transmitted from the (604 in FIG. 6) to an electronic stability control (ESC) device (606 in FIG. 6).

As shown in FIG. 8, in the eight step S817b, if it is determined by the controller (604 in FIG. 6) that the parking force value on which the EPB clamping force error compensation value (DCV in FIG. 3) is reflected is smaller than a preset reference value that is set in the controller (604 in FIG. 6) (S817a), the cooperative control command is prevented from being transmitted from the controller (604 in FIG. 6) to the ESC device (606 in FIG. 6).

On the other hand, in the eighth step S818, if it is determined by the controller (604 in FIG. 6) that the parking force value on which the EPB clamping force error compensation value (DCV in FIG. 3) is reflected is larger than the preset reference value (S817a), the cooperative control command may be transmitted from the controller (604 in FIG. 6) to the ESC device (606 in FIG. 6).

Figure 9:
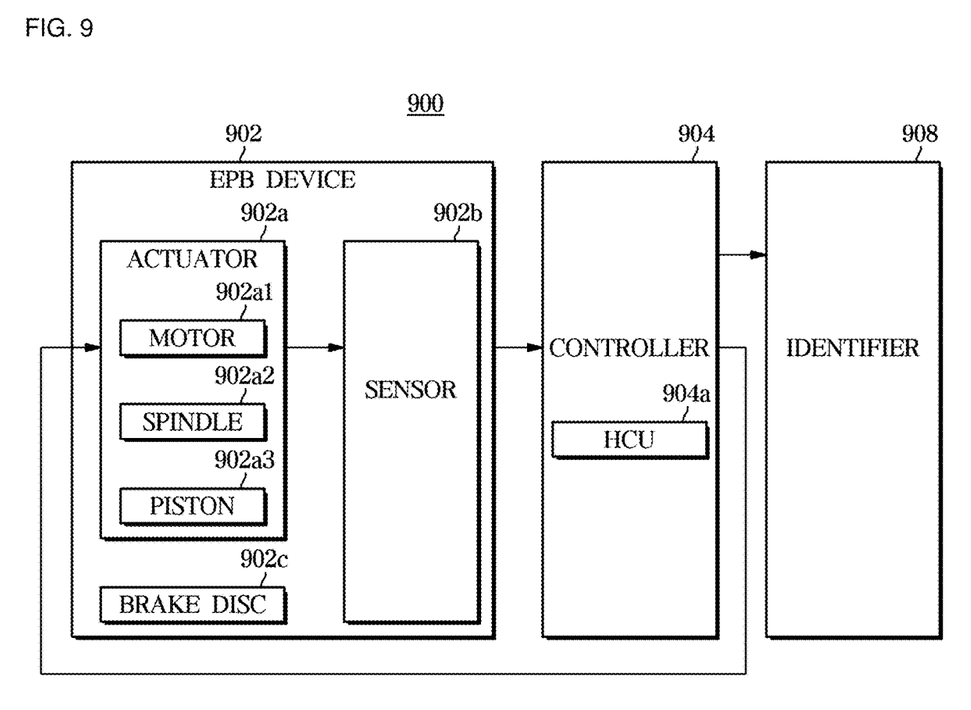
FIG. 9 is a block diagram illustrating still another example of a vehicle control apparatus according to an embodiment of the present disclosure.

FIG. 9 is a block diagram illustrating still another example of a vehicle control apparatus according to an embodiment of the present disclosure.

Referring to FIG. 9, a vehicle control apparatus 900 according to an embodiment of the present disclosure includes an EPB device 902 and a controller 904, similar to the vehicle control apparatus (100 in FIG. 1).

The function for each of the components of the vehicle control apparatus 900 according to the embodiment of the present disclosure and the organic connection relationship between the components are identical to those of the vehicle control apparatus (100 in FIG. 1). Details thereof will be omitted in the following description.

Here, the vehicle control apparatus 900 according to the embodiment of the present disclosure may further include an identifier 908.

That is, when the EPB clamping force error compensation value (DCV in FIG. 3) is calculated, the identifier 908 may notify that the EPB device 902 is in an abnormal operation state under the control of the controller 904.

Figure 10:
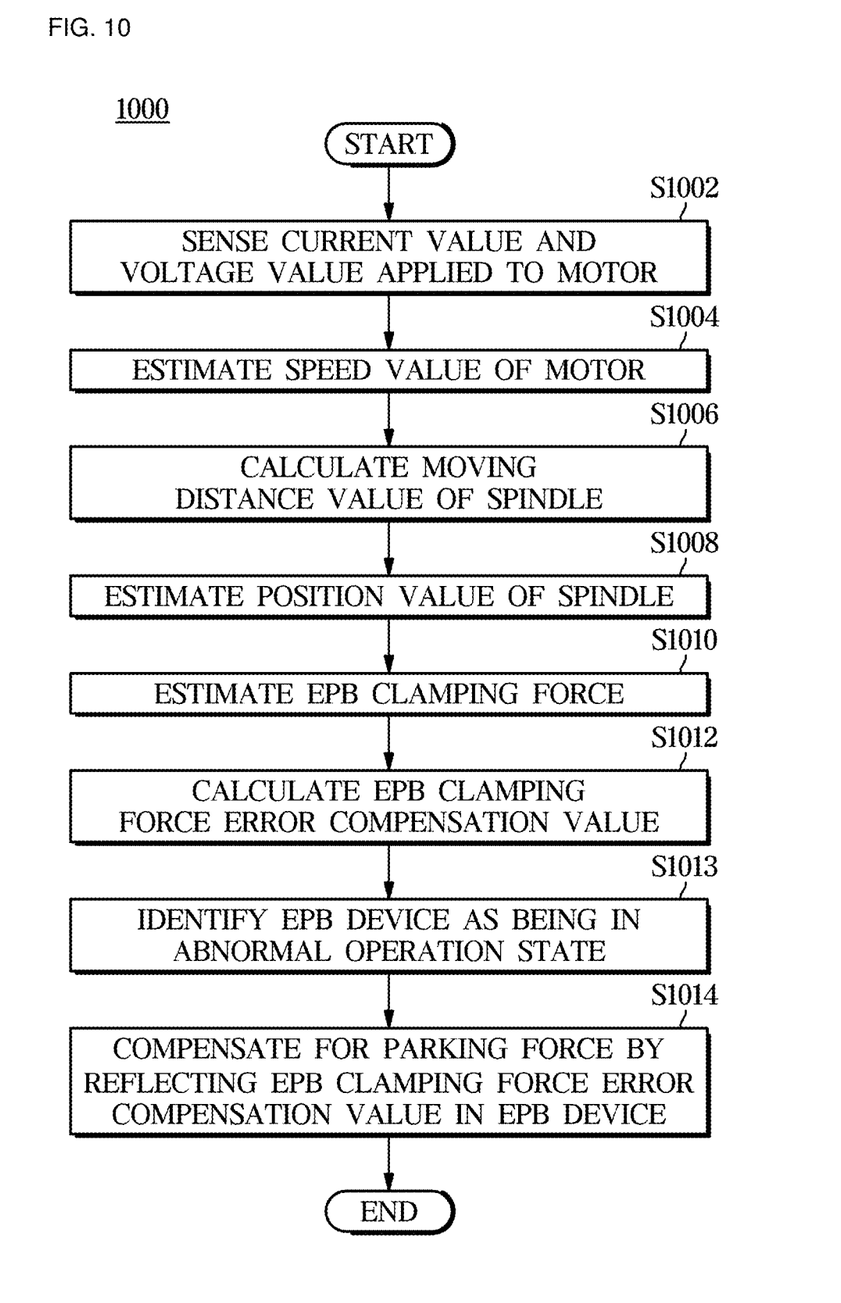
FIG. 10 is a flowchart showing still another example of a vehicle control method performed by a vehicle control apparatus according to an embodiment of the present disclosure.

FIG. 10 is a flowchart showing still another example of a vehicle control method performed by a vehicle control apparatus according to an embodiment of the present disclosure.

Referring to FIG. 10, similar to the vehicle control method (400 in FIG. 4) performed by the vehicle control apparatus (100 in FIG. 2), a vehicle control method (1000) performed by the vehicle control apparatus (900 of FIG. 9) according to an embodiment of the present disclosure includes a first step (S1002), a second steps (S1004), a third step (S1006), a fourth step (S1008), a fifth step (S1010), a sixth step (S1012), and a seventh step (S1014).

The function for each of the steps of the vehicle control method 1000 performed by the vehicle control apparatus (900 in FIG. 9) according to the embodiment of the present disclosure and the organic connection relationship between the steps are identical to those of the vehicle control method (400 in FIG. 1) performed by the vehicle control apparatus (100 in FIG. 1). Details thereof will be omitted in the following description.

Here, in the sixth step S1013 of the vehicle control method 1000 performed by the vehicle control apparatus (900 in FIG. 9) according to the embodiment of the present disclosure, after the EPB clamping force error compensation value (DCV in FIG. 3) is calculated, it is notified by the identifier (908 in FIG. 9) that the EPB device (902 in FIG. 9) is in an abnormal operation state under the control of the controller (904 in FIG. 9).

As another example, in the vehicle control method 1000 performed by the vehicle control apparatus (900 of FIG. 9) according to the embodiment of the present disclosure although not shown, the identifier (908 in FIG. 9) may notify that the EPB device (902 in FIG. 9) is in an abnormal operation state while being synchronized with the seventh step S1014 under the control of the controller (904 in FIG. 9).

As still another example, in the vehicle control method 1000 performed by the vehicle control apparatus (900 of FIG. 9) according to the embodiment of the present disclosure, although not shown, it may be notified by the identifier (908 in FIG. 9) that the EPB device (902 in FIG. 9) is in an abnormal operation state after the seventh step S1014 under the control of the controller (904 in FIG. 9).

Meanwhile, the actuator 102a, 602a, or 902a of the vehicle control apparatus 100, 600, or 900 according to the embodiment of the present disclosure may be an actuator for Motor On Caliper (MOC) that is configured to increase torque generated from the motors 102a1, 602a1, or 902a1 through a reducer (not shown) and obtain a required parking force by a mechanical structural device inside a caliper.

In addition, although not shown, the sensor 102b, 602b, or 902b of the vehicle control apparatus 100, 600, or 900 according to the embodiment of the present disclosure may include a current sensor (not shown) and a voltage sensor (not shown) for sensing the current and voltage values applied to the motor 102a1, 602a1, or 902a1 of the actuator 102a, 602a, or 902a.

In addition, although not shown, the controller 104, 604, or 904 of the vehicle control apparatus 100, 600, of 900 according to the embodiment of the present disclosure may be an Electronic Control Unit (ECU, not shown) or a Micro Control Unit (MCU, not shown) for controlling the overall operation of the vehicle, and performing determination, calculation, and estimation.

In addition, the controller 104, 604, or 904 is not limited thereto, and may be provided using any control device, determination device, calculation device, and estimation device that may control the overall operation of the vehicle, and perform determination, calculation, and estimation.

In addition, although not shown, the identifier 908 of the vehicle control apparatus 900 according to the embodiment of the present disclosure may include at least one of an alarm (not shown), a speaker (not shown), and a light emitting member (not shown) provided for a driver to identify information or a state of the vehicle, so as to notify that the EPB device 902 is in an abnormal operating state through at least one of an alarm operation of the alarm (not shown), a voice operation of the speaker (not shown), and a light emission operation of the light emitting member (not shown).

In addition, although not shown, the identifier 908 may include at least one of an instrument panel (not shown), a Human Machine Interface (HMI) module (not shown), and a Head-UP Display (HUD) module (not shown) that are mounted to interface a user with a machine for the driver to identify information or state of the vehicle, so as to notify that the EPB is in an abnormal state through at least one of a cluster message display operation of the instrument panel (not shown), a HMI message display operation of the HMI module (not shown), and a HUD message display operation of the HUD module (not shown).

As described above, the vehicle control apparatus 100 or 900 and the vehicle control method 400 or 1000 according to the embodiment of the present disclosure may allow the EPB device 102 or 902 to compensate for the parking force by reflecting the EPB clamping force error compensation value (DCV), thereby effectively improving the parking force of the EPB device 102 or 902.

In addition, the vehicle control apparatus 100 and the vehicle control method 500 according to the embodiment of the present disclosure may prevent the parking force compensation command from being transmitted to the EPB device 102 if the EPB clamping force error compensation value (DCV) is smaller than a preset reference value.

Accordingly, since the vehicle control apparatus 100 and the vehicle control method 500 according to the embodiment of the present disclosure prevent the parking force compensation command from being transmitted to the EPB device 102 if the parking force is expected so small to be felt by to the driver, thereby efficiently driving the EPB device 102 or 902, and suppressing an increase in power consumption.

In addition, the vehicle control apparatus 600 and the vehicle control method 700 according to the embodiment of the present disclosure may transmit a cooperative control command to the ESC device 606 unless being compensated for with the parking force value on which the EPB clamping force error compensation value (DCV) is reflected.

Accordingly, the vehicle control apparatus 600 and the vehicle control method 700 according to the embodiment of the present disclosure may perform cooperative control with the ESC device 606, so that the vehicle may be more stably and efficiently controlled.

In addition, the vehicle control apparatus 600 and the vehicle control method 800 according to the embodiment of the present disclosure may prevent the cooperative control command from being transmitted to the ESC device 606 if the parking force value on which the EPB clamping force error compensation value (DCV) is smaller than a preset reference value.

Accordingly, since the vehicle control apparatus 600 and the vehicle control method 800 according to the embodiment of the present disclosure may prevent a cooperative control command from being transmitted to the ESC device 606 if a parking force is expected so small to be felt by the driver, thereby efficiently driving the ESC device 606, and suppressing an increase in power consumption.

In addition, the vehicle control apparatus 900 and the vehicle control method 1000 according to the embodiment of the present disclosure may notify that the EPB device 902 is in an abnormal operating state after the EPB clamping force error compensation value (DCV) is calculated.

Accordingly, the vehicle control apparatus 900 and the vehicle control method 1000 according to the embodiment of the present disclosure may suppress anxiety about the operating state of the EPB device 902 felt by the driver, thereby improving the vehicle reliability and reducing the maintenance time.

As is apparent from the above, the vehicle control apparatus and a vehicle control method can effectively improve the parking force of an EPB device.

The vehicle control apparatus and a vehicle control method can efficiently drive an EPB device, thereby suppressing an increase in power consumption.

The vehicle control apparatus and a vehicle control method can control a vehicle more stably and efficiently.

The vehicle control apparatus and a vehicle control method can efficiently drive an ESC device, thereby suppressing an increase in power consumption.

The vehicle control apparatus and a vehicle control method can improve the vehicle reliability.

The vehicle control apparatus and a vehicle control method can reduce the maintenance time.

What is claimed is:

1. A vehicle control apparatus comprising:
   a sensor configured to sense a current value and a voltage value applied to a motor of an actuator of an electronic parking brake (EPB) device; and
   a controller configured to:
   estimate a speed value of the motor based on the sensed current value and the sensed voltage value;
   calculate a moving distance value of a spindle of the actuator based on the estimated speed value of the motor;
   estimate a position value of the spindle based on the calculated moving distance value of the spindle;
   estimate an EPB clamping force that acts on a brake disc of the EPB device based on the estimated position value of the spindle;
   calculate an EPB clamping force error compensation value between the estimated EPB clamping force value and a measured EPB clamping force value; and
   control the EPB device with a parking force compensation command on which the calculated EPB clamping force error compensation value is reflected to compensate for a parking force of the EPB device.

2. The vehicle control apparatus of claim 1, wherein the controller calculates the EPB clamping force error compensation value during an EPB clamping force error compensation section preceded by an EPB clamping preparation section and followed by an EPB clamping section of the EPB device.

3. The vehicle control apparatus of claim 1, wherein the controller controls the EPB device with the parking force compensation command to compensate for the parking force of the EPB device by reflecting the calculated EPB clamping force error compensation value, during the EPB clamping section of the EPB device.

4. The vehicle control apparatus of claim 1, wherein when measuring the EPB clamping force value, the controller is configured to:
   request a target wheel pressure value required for a parking force of the EPB device from a hydraulic control unit (HCU);
   measure moving distance values of the spindle moved backward and forward based on the current values applied to the motor to a position of an advanced piston of the actuator while a target wheel pressure corresponding the requested target wheel pressure value is maintained; and
   output, upon the measurement of the moving distance values of the spindle, an EPB clamping force corresponding to the moving distance values of the spindle after the target wheel pressure is released.

5. The vehicle control apparatus of claim 1, wherein when the EPB device compensates for the parking force, a magnitude of current applied to the motor is increased according to a size of the calculated EPB clamping force error compensation value.

6. The vehicle control apparatus of claim 1, wherein the controller prevents the parking force compensation command from being transmitted to the EPB device when the calculated EPB clamping force error compensation value is smaller than a preset reference value, and transmits the parking force compensation command to the EPB device when the calculated EPB clamping force error compensation value is larger than the preset reference value.

7. The vehicle control apparatus of claim 1, wherein the controller is further configured to:
   when the EPB device compensates for the parking force by reflecting the calculated EPB clamping force error compensation value, determine whether the parking force is compensated for with a parking force value on which the EPB clamping force error compensation value is reflected; and
   upon determining that the parking force is not compensated for with the parking force value on which the EPB clamping force error compensation value is reflected, transmit a cooperative control command to an electronic stability control (ESC) device.

8. The vehicle control apparatus of claim 7, wherein the controller is configured to:
   prevent the cooperative control command from being transmitted to the ESC device when the parking force value on which the EPB clamping force error compensation value is reflected is smaller than a preset reference value; and transmit the cooperative control command to the ESC device when the parking force value on which the EPB clamping force error compensation value is reflected is larger than the preset reference value.

9. A vehicle control method comprising:
   sensing a current value and a voltage value applied to a motor of an actuator of an electronic parking brake (EPB) device;
   estimating a speed value of the motor based on the sensed current value and the sensed voltage value;
   calculating a moving distance value of a spindle of the actuator based on the estimated speed value of the motor;
   estimating a position value of the spindle based on the calculated moving distance value of the spindle;
   estimating an EPB clamping force that acts on a brake disc of the EPB device based on the estimated position value of the spindle;
   calculating an EPB clamping force error compensation value between the estimated EPB clamping force value and a measured EPB clamping force value; and
   controlling the EPB device with a parking force compensation command on which the calculated EPB clamping force error compensation value is reflected to compensate for a parking force of the EPB device.

10. The vehicle control method of claim 9, wherein the EPB clamping force error compensation value is calculated during an EPB clamping force error compensation section preceded by an EPB clamping preparation section and followed by an EPB clamping section of the EPB device.

11. The vehicle control method of claim 9, wherein the EPB device is controlled by the parking force compensation command to compensate for the parking force of the EPB device by reflecting the calculated EPB clamping force error compensation value, during the EPB clamping section of the EPB device.

12. The vehicle control method of claim 9, wherein when measuring the EPB clamping force value:
   a target wheel pressure value required for a parking force of the EPB device is requested from a hydraulic control unit (HCU);
   moving distance values of the spindle moved backward and forward based on the current values applied to the motor to a position of an advanced piston of the actuator are measured while a target wheel pressure corresponding the requested target wheel pressure value is maintained; and
   upon the measurement of the moving distance values of the spindle, an EPB clamping force corresponding to the moving distance values of the spindle is output after the target wheel pressure is released.

13. The vehicle control method of claim 9, wherein when the EPB device compensates for the parking force, a magnitude of current applied to the motor is increased according to a size of the calculated EPB clamping force error compensation value.

14. The vehicle control method of claim 9, wherein the parking force compensation command is prevented from being transmitted to the EPB device when the calculated EPB clamping force error compensation value is smaller than a preset reference value, and the parking force compensation command is transmitted to the EPB device when the calculated EPB clamping force error compensation value is larger than the preset reference value.

15. The vehicle control method of claim 9, further comprising:
   when the EPB device compensates for the parking force by reflecting the calculated EPB clamping force error compensation value, determining whether the parking force is compensated for with a parking force value on which the EPB clamping force error compensation value is reflected; and
   upon determining that the parking force is not compensated for with the parking force value on which the EPB clamping force error compensation value is reflected, transmitting a cooperative control command to an electronic stability control (ESC) device.

16. The vehicle control method of claim 15, wherein:
   the cooperative control command is prevented from being transmitted to the ESC device when the parking force value on which the EPB clamping force error compensation value is reflected is smaller than a preset reference value; and the cooperative control command is transmitted to the ESC device when the parking force value on which the EPB clamping force error compensation value is reflected is larger than the preset reference value.

\* \* \* \* \*